United States Patent [19]

Porter

[11] 4,079,754
[45] Mar. 21, 1978

[54] APPARATUS FOR ELIMINATING NOISE IN THE FLOW OF FLUIDS

[75] Inventor: Don B. Porter, Downey, Calif.

[73] Assignee: Sargent Industries, Inc., Los Angeles, Calif.

[21] Appl. No.: 759,543

[22] Filed: Jan. 14, 1977

[51] Int. Cl.² .............................................. F15D 1/02
[52] U.S. Cl. .................................................... 138/42
[58] Field of Search .................................. 138/37–46; 137/629.3, 629.37, 629.33, 629.28; 291/118, 27, 209, 210, 211

[56] References Cited

U.S. PATENT DOCUMENTS 3,780,767  12/1973  Borg et al. ............................. 138/42

Primary Examiner—Houston S. Bell
Attorney, Agent, or Firm—Ellsworth R. Roston

[57] ABSTRACT

A member having first and second opposite ends for a flow of fluid from each end to the opposite end. The member is provided with openings at each end for receiving fluid into the member and for transferring the fluid from the member at the other end.

A first plurality of lands is provided in the member at spaced positions between the first and second opposite ends to define channels. The lands have passages at spaced positions in each land for the flow of the fluid through the passages between adjacent channels. The passages in each land have staggered positions in a direction transverse to the direction between the first and second ends to provide for a separation of the fluid flowing through each passage into two separate eddies in opposite directions. These eddies flow through the two adjacent passages in the next land.

A second plurality of lands is provided in the member at spaced positions in each channel in the transverse direction. The lands in the second plurality have orifices or passages through which the eddies flow from the passages in the previous land to the passages in the next land.

A plurality of the members may be tightly stacked. Each member has a flat surface. The lands may be flush with the flat surfaces and the passages may be recessed. Alternatively, the passages may be flush with the flat surfaces and the lands may be raised.

12 Claims, 6 Drawing Figures

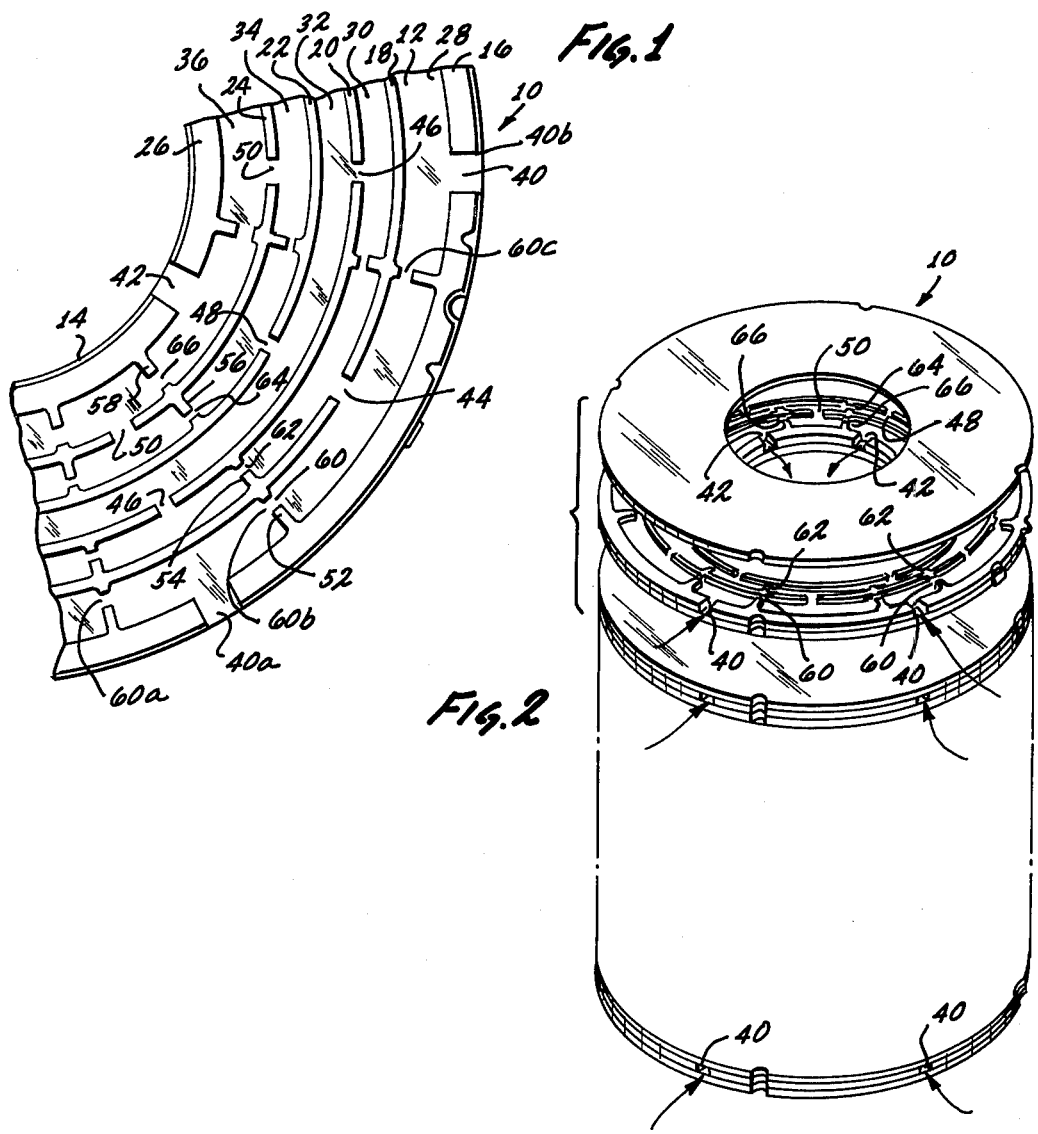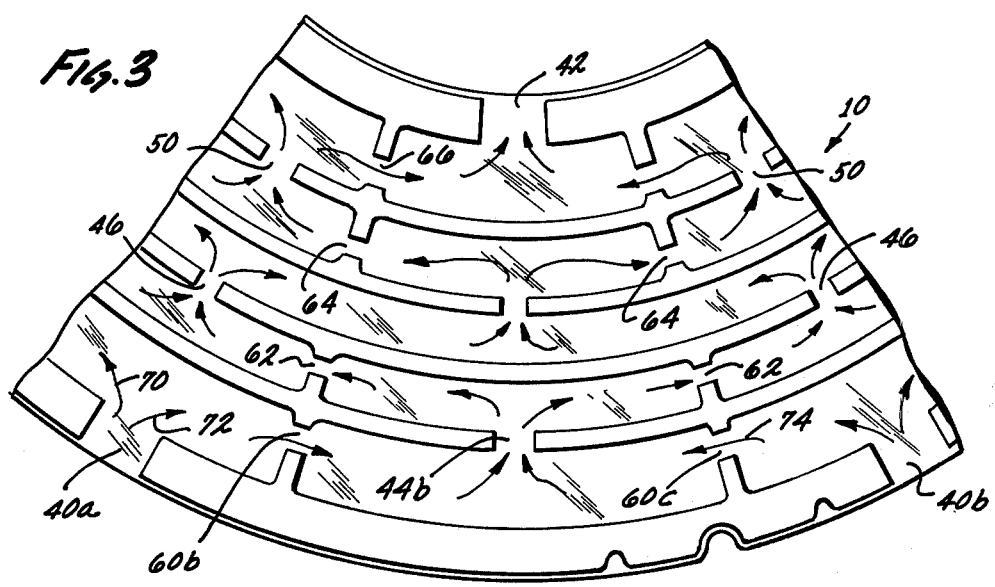

APPARATUS FOR ELIMINATING NOISE IN THE FLOW OF FLUIDS

This invention relates to apparatus for passing fluid and for eliminating any noise in such fluid during such passage. More particularly, the invention relates to apparatus for passing fluid on a controlled basis in either of two opposite directions and for eliminating any noise in the fluid during such passage.

There are a number of different types of installations providing fluid flow where noise produced by the passage of fluid has troublesome consequences. For example, it is important in submarines that fluid flows through hydraulic circuits with a minimum of noise. The production of any noise in such hydraulic circuits in a submarine could be detected by enemy apparatus and could be used to imperil the submarine. The production of noise by the flow of fluid in hydraulic circuits has also become important in commercial installations, particularly where pollutant noise is a problem.

Considerable effort has been devoted for a number of years to eliminate noise resulting from the flow of fluid in hydraulic circuits. Considerable progress has been made. However, the progress has been primarily made in hydraulic systems where fluid passes only in one direction. This has caused noise problems to still remain in hydraulic systems where controls are provided to produce a flow of fluid through the systems at times in one direction and at other times in an opposite direction.

This invention provides members which are capable of being disposed in a hydraulic system to eliminate noise produced by the flow of fluid in either of two opposite directions through the system. By installing these members in the hydraulic system, the system is operative to eliminate noise whether the fluid flows in a first direction or in an opposite direction through the system. The invention also includes embodiments which are operative to eliminate noise in the system by the flow of fluid through the system at rates considerably greater than those for which noise has been eliminated in the prior art.

In one embodiment of the invention, a member has first and second opposite ends for a controlled flow of fluid from either end to the opposite end. The member is provided with openings at each end for passing fluid into the member and for transferring the fluid from the member at the other end.

A first plurality of circumferential lands is provided in the member at radially spaced positions between the first and second opposite ends to define circumferential channels. The lands have passages at circumferentially spaced positions in each land for the flow of fluid through the passages between adjacent channels. The passages in each land have staggered positions in the circumferential direction to provide for a separation of the fluid flowing through each of the passages in each land into two separate eddies which flow in opposite directions. Each of these eddies is mixed with an eddy flowing in an opposite direction from the adjacent passage in that land. The mixture then flows through a passage in the next circumferential land.

A second plurality of radial lands is provided in the member at spaced positions in each channel in the transverse direction. Each of the lands in the second plurality has an orifice through which the eddy flows from the passages in the previous land to the passages in the next land. The radial passages are provided and sized to prevent cavitation of the fluid during the flow of the fluid, particularly when the fluid is flowing in either direction.

A plurality of the members may be tightly stacked to control the passage of the fluid. Each of the members has a flat surface. The passages and orifices may be flush with the flat surface and the lands may be raised. In the stacked relationship, the flat surface of each member abuts the lands in the adjacent member so that the fluid flows through the channels defined between the abutting members. Alternatively, the lands may be flush with the flat surfaces and the passages and orifices may be recessed in the flat surfaces. By this alternative embodiment, the noise in fluids flowing at relatively high rates may be eliminated.

In the drawings:

FIG. 1 is a fragmentary elevational view of a member constituting one embodiment of the invention and constructed to provide a controlled flow of fluid and to eliminate noise during such controlled flow of the fluid;

FIG. 2 is a perspective view illustrating in exploded relationship a plurality of the members of FIG. 1 which are normally disposed in a tightly stacked relationship to define apparatus for passing fluid and eliminating noise in the fluid during such passage;

FIG. 3 is an enlarged, fragmentary elevational view of a portion of the member shown in FIG. 1 and illustrates schematically the directions in which the fluid is controlled to flow by the member such that noise in the fluid is eliminated;

Figure 4:
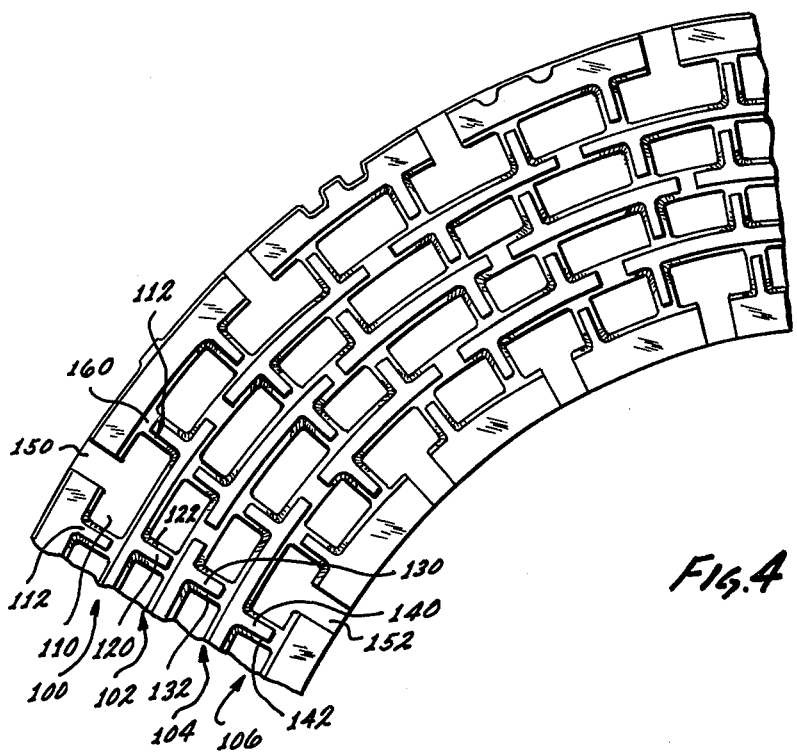
FIG. 4 is a fragmentary view, similar to FIG. 1, of a member constituting a second embodiment of the invention.

In the embodiment of the invention shown in FIGS. 1, 2 and 3, a member generally indicated at 10 is provided with a flat surface 12. The member is preferably in the shape of a thin disc with an axial hole 14 at its inner end. When the member 10 is in the shape of a thin disc, it has a plurality of lands 16, 18, 20, 22, 24 and 26 which extend annularly around the disc at spaced positions in the radial direction. Each of the lands 16, 18, 20, 22, 24 and 26 is raised from the flat surface of the disc 10. In this way, circumferential channels 28, 30, 32, 34 and 36 are respectively defined by the spacing between the lands 16 and 18, the lands 18 and 20, the lands 20 and 22, the lands 22 and 24, and the lands 24 and 26.

As will be seen, the radial widths of the lands 16 and 26 are substantially equal and are greater than the radial widths of the lands 18, 20, 22 and 24. Preferably, the radial widths of the lands 18, 20, 22 and 24 are substantially equal. Similarly, the radial widths of the channels 28 and 36 are substantially equal and are greater than the radial widths of the other channels. The radial widths of the channels 30, 32 and 34 may be substantially equal.

The land 16 is interrupted at spaced positions around its circumference to define openings 40 which are substantially flush with the flat surface of the disc 10. Similarly, the land 26 is interrupted at spaced positions around its circumference to define openings 42 which are substantially flush with the flat surface of the disc 10. The circumferential widths of the openings 40 and 42 may be substantially equal.

Interruptions are also provided at spaced positions around the circumferences of the lands 18, 20, 22 and 24 to define passages 44 in the land 18, 46 in the land 20, 48 in the land 22, and 50 in the land 24. The passages 44, 46, 48 and 50 are flush with the flat surface of the disc 10. The circumferential widths of the openings 44 and 50 are substantially equal and are greater than the circumferential widths of the passages 46 and 48, the widths of these passages also being substantially equal. Each of the passages 44 is disposed at a median position in the circumferential direction between a pair of adjacent openings 40 in the land 16. Preferably, the openings 40 and the passages 46 and 50 are radially aligned, as are the openings 42 and the passages 44 and 48. In this way, the passages in each of the circumferential lands are staggered with respect to the passages in the adjacent lands.

Radial lands are provided at spaced positions around the circumference of each of the channels 28, 30, 32, 34 and 36. The radial passages in the channels 28, 30, 34 and 36 are respectively illustrated at 52, 54, 56 and 58. Preferably, no radial lands are provided in the passage 32. For ease of manufacture, the radial lands 52, 54, 56 and 58 are radially aligned. The radial lands 52, 54, 56 and 58 are respectively provided with orifices 60, 62, 64 and 66 which are flush with the flat surface of the disc 10.

A plurality of the members 10 are adapted to be disposed in a stacked relationship. In this stacked relationship, each member 10 has a smooth face abutting the lands on the face of an adjacent member 10. In this way, fluid is able to flow in the channels defined between adjacent pairs of members 10 by the lands in one of the members in each pair. The fluid flows into the channels through the openings 40 and flows out of the channels through the openings 42 or the fluid may flow in a reverse direction by flowing into the channels through the openings 42 and outwardly through the openings 40.

When fluid flows into the channels 12 through the opening 40a (FIGS. 1 and 3), approximately half of the fluid moves in an eddy having a clockwise direction and indicated by an arrow 70 in FIG. 3. The fluid flows through the radial passage 60a and then flows into the channel 30 through one of the passages 44a (not specifically designated). The other half of the fluid flowing through the opening 40a moves in an eddy 72 having a counterclockwise direction. This fluid flows through the radial passage 60b into the circumferential passage 44b.

The fluid flowing in the eddy 72 is mixed with fluid which flows through the opening 40b and then flows in an eddy 74 in a clockwise direction through the radial passage 60c. The mixing of the fluid in the eddies 72 and 74 produces heat, partly by the mixing of the fluids and partly by friction of the fluid against the surface of the disc 10 during the flow of the fluid in the channel 28. The production of the heat is facilitated because the fluid flowing in the eddies 72 and 74 have relatively long paths resulting from the eddy effects. By converting the energy in the fluid into heat, any tendency for the fluid to produce noise during such flow is dissipated.

As the eddy 72 flows through the circumferential passage 60b, its rate of rotation increases because it is flowing through an orifice. This increase in the rate of flow tends to produce a swirl of the fluid in the radial channel 60b just as a swirl is produced during the flow of water from a bath through the orifice constituting the outlet into the drainpipe. This swirl tends to convert the energy in the fluid into heat, particularly since the length of the flow path of the fluid is increased by the swirl. A similar effect is produced when the fluid flowing in the eddy 74 flows through the radial channel 60c. Similar effects are also produced during the flow of the fluid through each of the radial passageways.

A swirl is also produced as the fluid in the eddies 72 and 74 flows through the circumferential channel 44b. This swirl also tends to convert the energy in the fluid into heat. The production of the swirl is facilitated by the mixing of the oppositely directed eddies 72 and 74 as these eddies approach the circumferential passage 44b. A similar conversion of the energy in the fluid into heat is also produced during the flow of the fluid through each of the circumferential passages.

As will be seen, the passages 50 are preferably wider than the passages 48 and the openings 42 are preferably wider than the passages 48. This provides for an orderly flow of the fluid through the channels and outwardly through the openings 42. By providing openings of increasing size as the fluid passes through the passageways 48 into the channel 34, then through the passages 50 into the channel 36 and then through the openings 42, a gradual change in dimensions between the openings in the member 10 and the openings in the output member (not shown) is facilitated. This causes the fluid to be transferred in an orderly manner through the openings 42 into the member (not shown) on the output side of the openings 42. Similarly, when fluid flows through the channels and outwardly through the openings 40, the flow of fluid through the openings 40 into the output member (not shown) is orderly because the passageways 44 are larger than the passages 46 and the openings 40 are larger than the passages 44.

The radial passages 60, 62, 64 and 66 are instrumental in inhibiting cavitation when fluid flows into the openings 40 and outwardly through the openings 42. Cavitation is produced when the static pressure of the fluid is decreased to a pressure corresponding, as a practical matter, to the vapor pressure of the fluid so that bubbles are created. When the static pressure increases, the bubbles collapse and cause shock waves to be created. As will be appreciated, such formation of shock waves is undesirable since the shock waves tend to produce noise. Cavitation of the fluid would tend to become pronounced during the flow of fluid through the channels and outwardly through the openings 42 since the velocity of fluid flow tends to increase in the successive channels because of the progressive cramping of the channels toward the radial center of the disc 10.

As will be seen, the radial lengths of the passages 60 are greater than the radial lengths of the passages 62. Similarly, the radial lengths of the passages 66 are greater than the radial lengths of the passages 64. In this way, any tendency of the fluid to cavitate is further minimized because of the progressive increase in the size of the passages as the fluid flows towards the openings leading to the output members (not shown).

Figure 5:
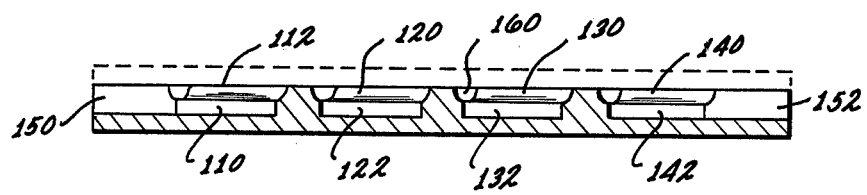
FIG. 5 is a sectional view substantially on the line 5—5 of FIG 6.
Figure 6:
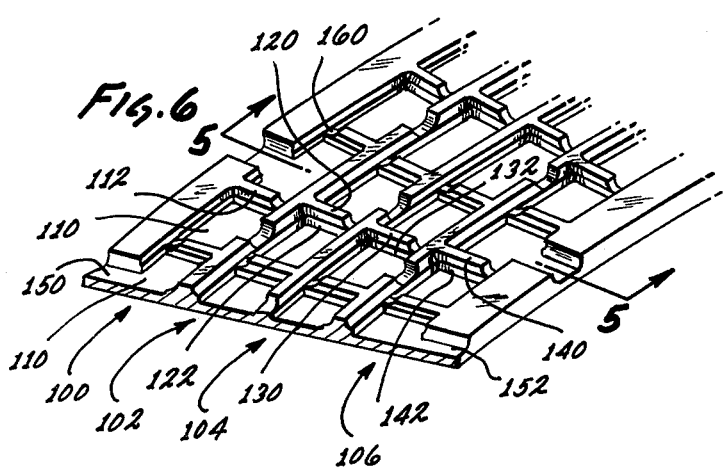
FIG. 6 is a fragmentary perspective view of the member shown in FIGS. 4 and 5.

FIGS. 4, 5 and 6 illustrate a second embodiment of the invention. In this embodiment, the lands are flush with the flat surfaces of the disc and the passages are recessed. In the embodiment shown in FIGS. 4, 5 and 6, passages and lands are provided at substantially the same positions as the passages and the lands in the embodiment shown in FIGS. 1, 2 and 3. For example, channels generally indicated at 100, 102, 104 and 106 are included in the embodiment shown in FIG. 4. The channel 100 is defined by passages 110 and lands 112; the channel 102 is defined by passages 120 and lands 122; the channel 104 is defined by passages 130 and lands 132; and the channel 106 is defined by passages 140 and lands 142. Fluid flows through the passages between openings 150 and 152. Each of the passages in a channel communicates with the adjacent passages in a channel by providing stepped portions raised above the passages but disposed below the lands in the channels. For example, stepped portions 160 are provided in the area around the passages 110 and adjacent the lands 112 to provide a communication between adjacent passages for the flow of fluid.

The embodiment shown in FIG. 4 has certain advantages. It provides an efficient conversion of energy in the fluid to thermal energy because of the considerable friction imposed upon the fluid during the flow of the fluid through a pressed stack of discs such as shown in FIG. 4. As a result, this embodiment is particularly advantageous in eliminating noise in fluids when the fluids flow into the stack at a relatively high rate. The embodiment shown in FIG. 4 is also particularly advantageous when a relatively large drop in pressure is produced in the discs.

It will be appreciated that the amount of friction imposed upon the fluid by a stack of discs such as shown in FIG. 4 is dependent upon the depth of the passages and the stepped portions in the discs. As the depth of the passages and stepped portions is decreased, the amount of friction imposed upon the fluid tends to increase.

A stack of discs can also be formed from a combination of discs of the embodiment shown in FIGS. 1, 2 and 3 and the embodiment shown in FIG. 4. This mixture of discs has the advantage of eliminating noise in fluid whether the fluid is flowing at high rates or low rates and whether the fluid is flowing toward or away from the radial center of the discs. The discs can be stacked in any desired combination to achieve these results.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination for providing a quiet and controlled flow of fluid,
   at least one disc having openings at opposite ends for receiving fluid at either end and for providing for a flow of fluid outwardly at the other end,
   the disc being provided with annular lands at spaced positions in the radial direction to define annular channels between the lands,
   the disc being provided with passages in the annular lands at spaced circumferential positions to provide first passages for the radial flow of the fluid between successive channels, the passages in each of the annular lands being staggered in the circumferential direction relative to the passages in the adjacent lands,
   the disc being provided, at spaced positions in the circumferential directions, with radial lands extending between adjacent pairs of the annular lands and having radial interruptions to define second passages for the annular flow of the fluid in the channels.

2. The combination set forth in claim 1 wherein a plurality of discs constructed as set forth in claim 1 are disposed in a stacked relationship.

3. The combination set forth in claim 1 wherein each of the radial lands is disposed, in the circumferential direction, between the closest one of the first passages providing for the flow of the fluid to the radial land and the closest one of the first passages receiving the flow of the fluid from the radial land.

4. The combination set forth in claim 3 wherein
   the disc has a flat surface and the radial and circumferential lands constitute portions raised from the flat surface of the disc and the first and second passages and the openings are substantially flush with the flat surface of the disc.

5. The combination set forth in claim 3 wherein
   the disc has a flat surface and the radial and the circumferential lands are flush with the flat surface of the disc and the first and second passages and the openings are recessed from the flat surface of the disc.

6. The combination set forth in claim 3 wherein
   the annular channels between the openings are recessed.

7. In combination for providing a quiet and controlled flow of fluid,
   a member having first and second opposite ends and constructed to provide for a flow of fluid from either of the first and second ends to the other of the first and second ends, the member having openings at the first and second ends for receiving the fluid into the member and for transferring the fluid from the member,
   a first plurality of lands provided in the member, at spaced positions between the first and second opposite ends of the member, to define channels, the lands being constructed to define first passages at spaced positions in each land for the flow of the fluid through the passages between adjacent channels, the first passages in each land in the first plurality being staggered in position in a direction transverse to the direction between the first and second ends to provide for a separation of the fluid flow through each of the first passages into two separate eddies in opposite directions for passage of the fluid through the two adjacent passages in the next land in the first plurality, and
   a second plurality of lands provided in the member at spaced positions in each channel, the lands in the second plurality being disposed to define second passages through which the eddies of fluid flow from the first passages in the previous land in the first plurality to the first passages in the next land in the first plurality.

8. The combination set forth in claim 7 wherein
   a plurality of members constructed as set forth in claim 7 are provided and wherein the members are maintained in a tightly stacked relationship.

9. The combination set forth in claim 7 wherein
   the openings at each end are larger than the passages and the passages in the land adjacent the openings are larger than the passages intermediate the opposite ends.

10. The combination set forth in claim 9 wherein
    the member has a flat surface and the lands on the first and second pluralities are raised from the flat surfaces and the openings and the first and second passages are flush with the flat surface.

11. The combination set forth in claim 9 wherein the member has a flat surface and the lands in the first and second pluralities are flush with the flat surface and the openings and the passages are recessed in the flat surfaces.

12. The combination set forth in claim 11 wherein the channels are recessed between the lands in the second plurality to facilitate the eddy of the fluid in the channels.

* * * * *